(12) United States Patent
Singh et al.

(10) Patent No.: US 6,580,442 B1
(45) Date of Patent: Jun. 17, 2003

(54) TOUCH-BASED INFORMATION PROCESSING DEVICE AND METHOD

(75) Inventors: Mona Singh, Cary, NC (US); Billy Gayle Moon, Morrisville, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/452,686

(22) Filed: Dec. 1, 1999

(51) Int. Cl.[7] .............................................. G09G 05/00
(52) U.S. Cl. ........................................ 345/840; 345/173
(58) Field of Search .................................. 345/173, 864, 345/810, 817, 818, 819, 820, 840

(56) References Cited

U.S. PATENT DOCUMENTS 6,310,610 B1 * 10/2001 Beaton et al. .............. 345/173

OTHER PUBLICATIONS

Using Microsoft Internet Explorer 4, 1997. Jim O'Donnell and Eric Ladd. Que Corporation: p. 51.*

* cited by examiner

*Primary Examiner*—John Cabeca
*Assistant Examiner*—Brian Detwiler
(74) *Attorney, Agent, or Firm*—Myers Bigel Sibley & Sajovec, P.A.

(57) ABSTRACT

A method and information processing device including a touch-responsive display for displaying a menu including at least one menu item, an information icon displayed adjacent the at least one menu item and showing an action which may be performed on the menu item, and a touch icon displayed adjacent the at least one menu item in a touch-responsive area of the display. A processor is coupled to the touch-responsive display, is adapted to detect contact with the touch-responsive area defining the touch icon, and is responsive to the detecting to perform the action shown by the information icon on the corresponding menu item.

28 Claims, 6 Drawing Sheets

TOUCH-BASED INFORMATION PROCESSING DEVICE AND METHOD

FIELD OF THE INVENTION

The present invention is directed toward a device, and more particularly toward a touch-based device for processing information.

BACKGROUND OF THE INVENTION

The "look and feel" of a device gives a user an impression how the device operates from the appearance of the device. For example, where the device is a handheld device utilizing a Windows 95-type desktop, for example Windows CE, the user expects the handheld device to function in a manner similar to Windows 95.

Systems utilizing Windows-type desktops, for example personal computers, typically use a mouse to select or expand menu items. The mouse is represented by a mouse pointer on the screen. The mouse pointer is placed over the desired selection or item to be expanded, and a button on the mouse is pressed to perform the selection or expansion of the menu item. A typical expandable menu item is shown in FIG. 1.

Figures 1, 2A:
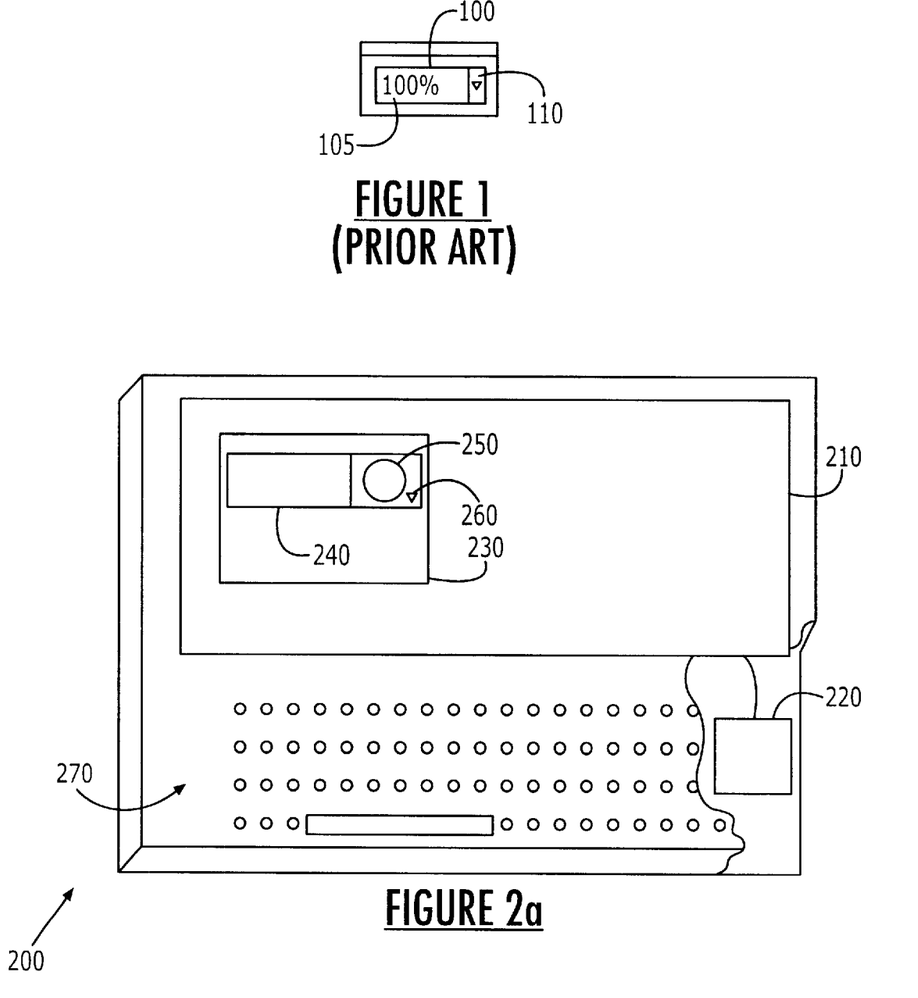
FIG. 1 illustrates a prior art expandable menu item.
FIG. 2a illustrates a handheld information processing device in accordance with an embodiment of the invention.

In FIG. 1, a menu item 100, here showing a value 105 representing the percentage of actual size that text may be displayed on, for example, a display for the personal computer. may be selected by placing the mouse pointer over a main information element 110 and pressing a button on the mouse. The "▼" symbol within the main information element 110 indicates that selection of the menu item will cause a expanded menu of, in this case, percentages to be displayed on the display. Because the mouse pointer is typically small, placing the mouse pointer over the main information element 110 does not obstruct the "▼" symbol.

Handheld devices also use a Windows-type desktop where the same structure for the menu item 100 and main information element 110 are used, but the handheld devices typically do not have a mouse. Rather, handheld devices use a touch-responsive display where selections are made by the user touching, for example, the main information element 110 to select or expand the menu item 100. However, it is not always intuitive on handheld devices where on the display the user must touch in order to perform a desired action, for example selecting or expanding menu items. Further, when touching the main information element 110 to perform the selection or expansion, the user blocks the symbol in the main information element 110, here the "▼" symbol, obstructing their view of what action will occur.

The present invention is directed to overcoming one or more of the problems discussed above.

SUMMARY OF THE INVENTION

In one aspect of the present invention, an information processing device includes a display adapted to selectively display a menu including at least one menu item, an information icon displayed adjacent the at least one menu item, said information icon showing an action which may be performed on the menu item, and a touch icon displayed adjacent the at least one menu item and within a touch-responsive area of the display, where the touch icon does not overlap the information icon. A processor is coupled to the display, adapted to detect contact with the touch-responsive area of the display and, responsive to the detecting, to perform the action shown by the information icon on the corresponding menu item.

In one form, the information icon is displayed as an arrow icon.

In another form, the processor changes a form of the information icon displayed on the display in response to contact detected with the area defining the touch icon. In a further form, the information icon form is selectively one of a plus sign and a minus sign, and the processor selects the form of the information icon as the other of the plus sign and the minus sign in response to contact detected with the touch-responsive area.

In another form of the present invention, the information icon is one of a plus sign and a minus sign.

In yet another form, the touch-responsive area is round.

In another form, the processor is adapted to cause a sub-menu to be displayed in response to contact detected with the touch-responsive area, the sub-menu corresponding to the touch icon and including at least one child menu item. In a further form, the processor is adapted to cause the at least one child menu item to be displayed horizontally on the display below the corresponding touch icon.

In another form, the menu is in the form of a tree structure, and the at least one menu item is at least one tree structure element.

In yet another form, the menu is in the form of a combination box structure, and the at least one menu item is at least one combination box element.

In another form of the invention, the menu is in the form of a table structure, and the at least one menu item is at least one table element.

In yet another form, the menu is in the form of a scroll bar, and the at least one menu item is at least one scroll display indicator.

In another aspect of the invention, a method for processing information for a touch-based menu-driven device comprises displaying on a display a menu having at least one menu item, an information icon corresponding to the at least one menu item adjacent the menu item, said information icon showing an action which may be performed on the menu item, and a touch icon corresponding to the at least one menu item and displayed in a touch-responsive area of the display not overlapping the information icon. Contact with the touch-responsive area is detected. Responsive to detecting contact, the action shown is performed by the information icon.

In one form, the form of the information icon is altered responsive to the detecting.

In another form, performing the action includes displaying a drop-down menu for the corresponding menu item. In a further form, displaying the drop-down menu includes displaying the drop-down menu as a horizontal menu having one or more child menu items. In a further form yet, a scrolling option is provided to view the child menu items

DETAILED DESCRIPTION OF THE DRAWINGS

FIG. 2a illustrates a hand-held information processing device 200 in accordance with an embodiment of the present invention. The device 200 includes a touch-responsive display 210, coupled to a processor 220. The processor 220 is suitably programmed to cause information, for example a menu 230, having at least one selectable information element, for example a menu item 240, to be displayed on the touch-responsive display 210. The processor 220 is further suitable for causing a touch icon 250, resembling a button, and an information icon 260 to be displayed adjacent the menu item 240, and for detecting and responding to user input via the touch-responsive display 210. Other input elements, for example a miniature keyboard shown generally at 270 may be used by the user to input information to the device 200.

In operation, contact with the touch icon 250 selects or expands the corresponding menu item 240. This is accomplished as the processor 220 detects contact with an area of the screen defined by the touch icon 250, and performs an action on the corresponding menu item 240 indicated by the information icon 260. Here, the information icon 260 is a "▼" symbol, indicating that the processor 220 will cause an expanded menu to be displayed when the touch icon 250 is contacted. The contact may be made to the touch icon 250 using, for example, a stylus or a finger.

The touch icon 250, being in the form of a button, emphasizes the touchability of the touch icon 250 as compared with the prior art main information element 110 (FIG. 1) which the user expects to select using a mouse pointer. Additionally, the touch icon 250 being separate from the information icon 260 makes it possible to touch the touch icon 250 without blocking the symbol indicating which action will occur, unlike the blocking of the "▼" symbol that occurs when the user touches the main information element 110 in the prior art.

Figure 2B:
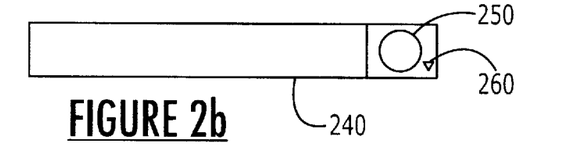
FIG. 2b illustrates alternate placement of the touch icon with respect to the information icon in accordance with an embodiment of the invention.

FIG. 2b shows an alternative positioning of the touch icon relative to the information icon in accordance with an embodiment of the invention. The touch icon 250 is shown as being displayed on the touch responsive display 210 adjacent the menu item 240 and in contact with the information icon 260. Such relative placement of the touch icon and the information icon 260 emphasizes touchability of the touch icon while allowing the user to touch the touch icon without blocking the information icon.

The menu 230 with at least one menu item 240 may take many forms, including but not limited to a tree-structure having at least one tree-structure element, a combination box structure, having at least one combination box structure element, radio boxes having at least one radio button, check boxes having at least one check button, and tables having at least one table element. The menu 240 may further take the form of any selectable element displayed on the display 210 including a scroll bar.

Although the touch icon 250 and information icon 260 are shown in conjunction with the expandable menu item 240, the touch icon 250 and information icon 260 may be used for any selectable element displayed on the touch-responsive display 210, some of such selectable elements being described below.

Figure 3:
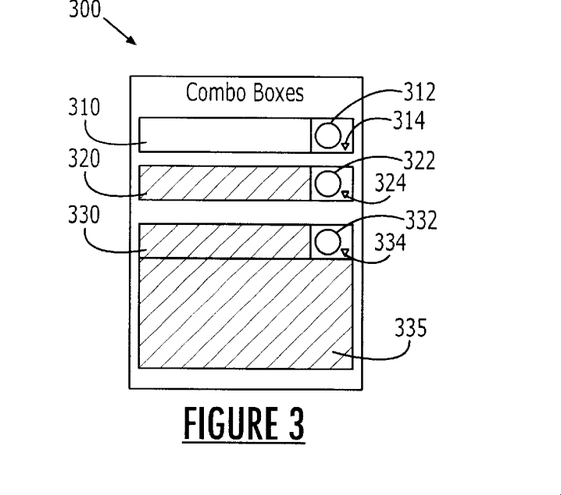
FIG. 3 illustrates a combination-box structure in accordance with an embodiment of the invention.

FIG. 3 illustrates a combination-box structure 300 which may be displayed on a display, in accordance with an embodiment of the invention. A first combo element 310 corresponding to a first combo touch icon 312 and a first combo information icon 314 is shown. A second combo element 320 is shown corresponding to a second combo touch icon 322 and a second combo information icon 324. A third combo element 330 is shown corresponding to a third combo touch icon 332 and a third combo information icon 334.

The processor 220 is suitably connected to the display and programmed for determining when areas defined by the first, second and third combo touch icons 312, 322 and 332 have been touched (thus selected) by the user of the device 200. When it is determined that one of the first, second or third combo touch icons 312, 322 and 332 have been selected, the processor carries out the action indicated by the corresponding information icon 314, 324 and 334.

Here, the first combo element 310 has a "shaded-in" appearance, indicating that the first combo element 310 is disabled. The processor is programmed not to respond to contact made with the display 210 in the area defined by the combo touch icon 312. The second combo element 320 is selectable, as indicated by the second combo element 320 not having the shaded-in appearance. The processor is suitably programmed to detect contact made with the display 210 at the area defined by the second combo touch icon 322, and when contact is detected, to perform the action on the corresponding combo element 320 indicated by the combo information icon 324. The third combo element 330 is a selected combo element, as indicated by an expanded menu 335 appearing below the third combo element 330, and by the "pressed-in" appearance of the third combo touch icon 332. The processor 220 has thus detected contact with the area of the screen defining the third combo touch icon 332, and performed the action indicated by the third combo information element 334 by displaying the expanded menu 335. The expanded menu 335 may include further selectable combo elements (not shown).

Having the first, second and third combo touch icons 312, 322 and 332 in the form of a button emphasizes the touchability of the touch icons. Further, as the first, second and third combo information icons 314, 324 and 334 are separate from the touch icons 312, 322 and 332, the actions performed by the touch icons are not blocked when the user touches the first, second and third combo touch icons 312, 322 and 332.

Figure 4:
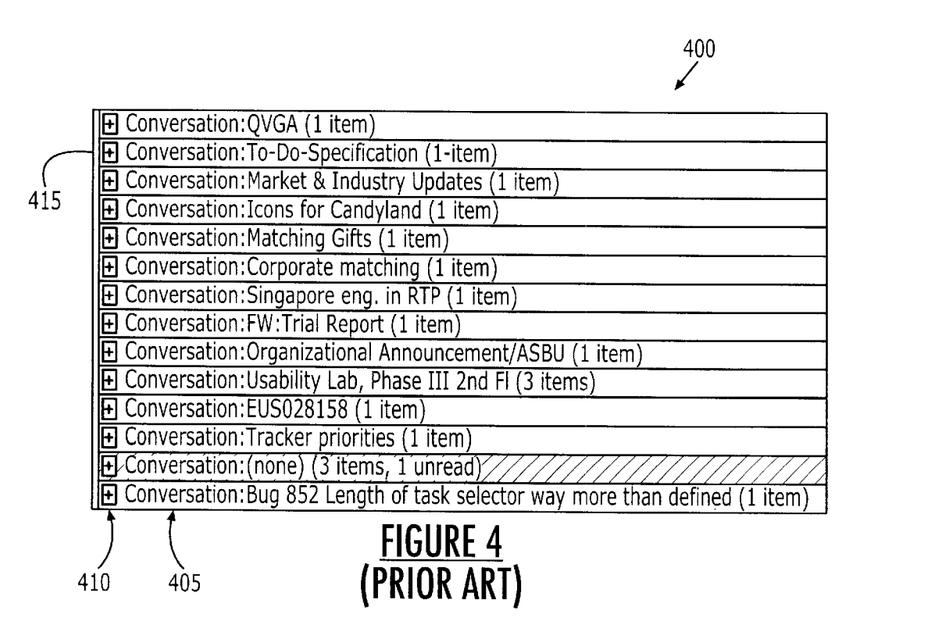
FIG. 4 illustrates a prior art tree-structure.

FIG. 4 illustrates a prior art tree-structure menu 400. The tree structure 400 includes a plurality of expandable tree structure elements shown generally at 405, each having a corresponding main-information element shown generally at 410. A "+" symbol indicates that the tree structure element corresponding to the main information element may be expanded. For example, if a main information element 415 is touched, two sub-items regarding "Conversation: Icons for Candyland" would be displayed on the display. However, touching the main information element 415 obstructs the user's view of the symbol in the main information element 415 (here the "+" symbol) which indicates the action that will occur.

Figure 5:
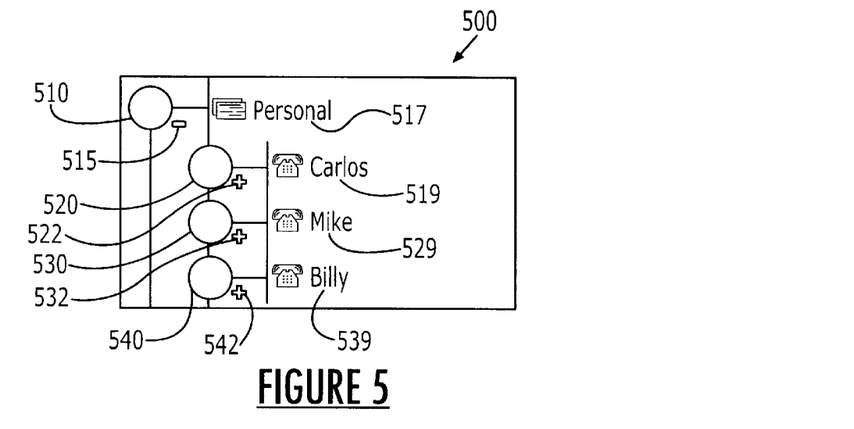
FIG. 5 illustrates a tree-structure in accordance with an embodiment of the invention.

FIG. 5 illustrates a tree-structure 500 which may be displayed on a display in accordance with an embodiment of the invention. A tree touch icon 510 and a tree information icon 515 correspond to a tree structure element 517. Here, the tree information icon 515 is a "−" indicating that the processor 220 has detected contact with the tree touch icon 510, and expanded the tree structure element 517. The tree touch icon 510 has been expanded to three sub-tree elements 519, 529 and 539 having corresponding sub-tree touch icons 520, 530 and 540 respectively. The sub-tree touch icons 520, 530 and 540 have corresponding information icons 522, 532 and 542 respectively. Each of the sub-tree information icons 522, 532 and 542 are "+" symbols, indicating that contact of the corresponding sub-tree touch icons 520, 530 and 540, when detected by the processor 220, will cause the processor to display further information corresponding to the sub-tree elements 519, 529 and 539.

The tree information icon 515 and the first, second and third sub-tree information icons 522, 532 and 542 being distinct and separate from the tree touch icon 510 and the first, second and third sub-tree touch icons 520, 530 and 540, makes it possible to select the corresponding menu item by touching the touch icons without obstructing the user's view of which action will occur.

Figure 6A:
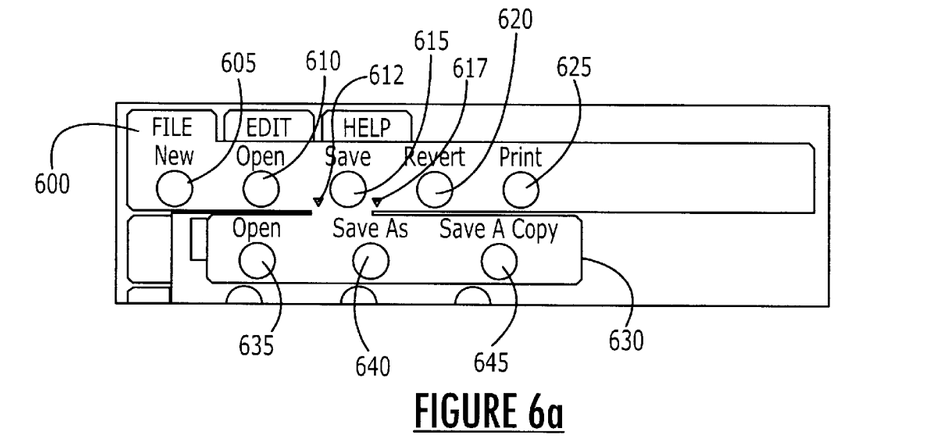
FIG. 6a illustrates a main menu with a sub-menu in accordance with an embodiment of the invention.

FIG. 6a illustrates a main menu with a sub-menu that may be displayed on a display in accordance with another embodiment of the invention. The menu 600 includes five selectable touch icons: A "New" touch icon 605, an "Open" touch icon 610, a "Save" touch icon 615, a "Revert" touch icon 620, and a "Print" touch icon 625. The "Open" touch icon 610 has a corresponding "Open" information icon 612, and the "Save" touch icon 615 has a corresponding "Save" information icon 617, where the information icons 612 and 617 are "▼" symbols indicating the expandability of the main menu 600 to corresponding sub-menus. Specifically, the shaded appearance of the "Open" touch icon 610 indicates that the touch icon 610 is enabled to be expanded to a corresponding sub-menu, and accordingly that the processor 220 will respond to a detected touch of the "Open" touch icon 610. The "pressed" appearance of the "Save" touch icon 615 indicates that the processor 220 has detected a touch to the touch icon 615, and caused a corresponding sub-menu 630 to be displayed on the display 210. The off-shaded appearance of the "Print" touch icon 625 indicates that the touch icon 625 is currently disabled, and the processor 220 will accordingly not respond to a touch to the "Print" touch icon 625.

The sub-menu 630 includes three sub-menu icons, a "Save" touch icon 635, a "Save As" sub-menu touch icon 640, and a "Save A Copy" sub-menu touch icon 645. The processor 220 may be suitably programmed to display the sub-menu touch icons centered about the touch icon from which they have expanded. The sub-menu 630, appearing on a horizontal panel rather than a vertical panel, makes it possible to preserve vertical space on a screen for the hand-held touch-based device. Further, when sub-menu items are displayed in a vertical panel, the shape of a typical user's finger may inadvertently cover more than one sub-menu item simultaneously, thereby causing more than one of the sub-menu items to be selected. The horizontal format of the sub-menu 630 reduces this risk, and thereby enhances the user experience with the touch-screen device.

Figure 6B:
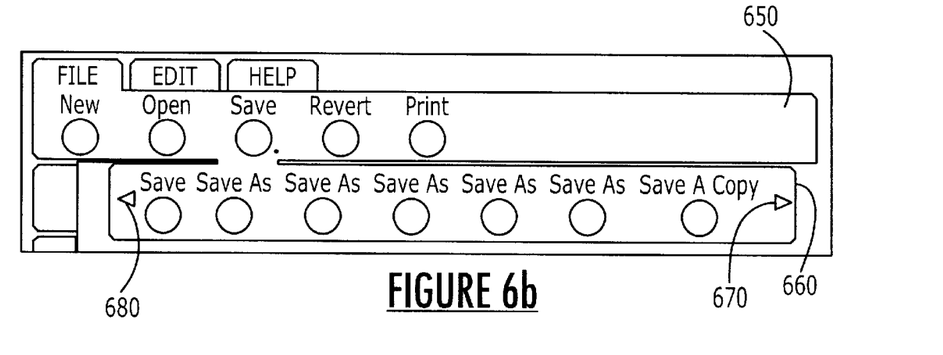
FIG. 6b illustrates a main menu with a sub-menu having scrollable menu bars in accordance with an embodiment of the invention.

FIG. 6b illustrates a menu 650 with a sub-menu 660 having scrollable menu bars 670 and 680 which may be displayed on a display, in accordance with an embodiment of the invention. Where the drop-down or sub-menu 660 includes more items than can naturally fit on the screen of the touch-screen device, touching the scroll arrows 670 and 680 makes it possible for further menu items to be scrolled on to the screen.

In an alternate embodiment not shown, the right scroll arrow 670 and the left scroll arrow 680 may be positioned above a right touch icon and a left touch icon, where the right and left touch icons are the rightmost and the leftmost touch icons displayed within the sub-menu 660. Touching the right touch icon causes the selections in the sub-menu 660 to scroll left, displaying additional sub-menu items. Similarly, touching the left touch icon causes the menu items in the sub-menu 660 to scroll right, thereby displaying additional sub-menu items. In a further embodiment, the scroll arrows 670 and 680 above the right and left touch icons may be replaced with a written description, for example "scroll right" above the right touch icon, and "scroll left" above the left touch icon.

Figure 7A:
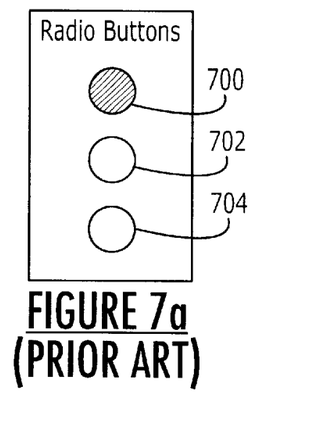
FIGS. 7a and 7b illustrate prior art radio buttons and check boxes respectively.
Figure 7B:
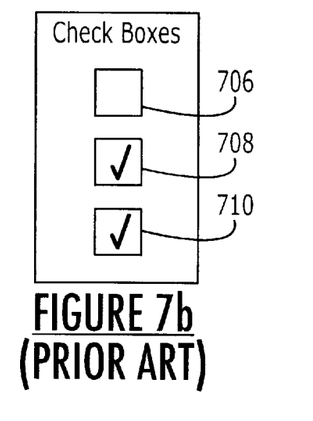

FIGS. 7a and 7b illustrate prior art radio buttons and checkboxes respectively. Radio buttons are typically used to select only one of a plurality of menu items (typically options for a program running on an information processing device) corresponding to the radio buttons. Checkboxes are generally used to select from none to all of the menu items (also typically options) corresponding to the checkboxes.

FIG. 7a shows a first radio button 700, a second radio button 702, and a third radio button 704. When the user touches one of the radio buttons 700, 702 and 704, that radio button becomes filled-in, indicating that the corresponding menu item is selected as an option. For example, radio button 700 has a filled-in appearance, and therefore indicates that it has been selected by the user.

FIG. 7b shows a first check box 706, a second check box 708 and a third check box 710. A "✓" symbol will appear in the check boxes 706, 708 and 710 that have been touched, and thus selected, by the user. As "✓" symbols are present within the check boxes 708 and 710, it is indicated that the user has touched the check boxes 708 and 710.

When the user is touching the radio buttons 700, 702 and 704, or the check boxes 706, 708 or 710, the user must remove their finger to determine whether the touch to the desired radio button or desired check box has been detected. Further, it is not always apparent to a user that a radio button or check box is to be selected by touching that radio button or check box.

Figure 7C:
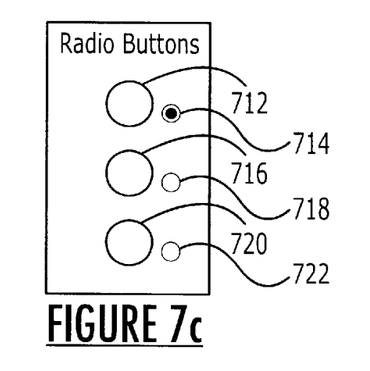
FIGS. 7c and 7d illustrate radio buttons and check boxes respectively in accordance with an embodiment of the invention.
Figure 7D:
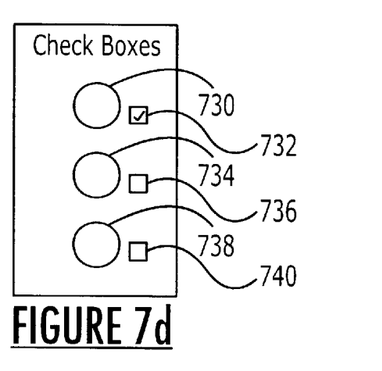

FIGS. 7c and 7d illustrate radio buttons and check boxes respectively that may be displayed on a display, in accordance with an embodiment of the invention.

In FIG. 7c, a first radio touch icon 712 and a corresponding first radio information icon 714, a second radio touch icon 716 and a corresponding second radio information icon 718, and a third radio touch icon 720 and corresponding third radio information icon 722 are shown. A user selects a menu item by touching one of the first, second or third radio touch icons 712, 716 or 720 corresponding to the desired menu item. A touch to any of the first, second or third radio touch icons 712, 716 or 720 is detected by the processor 220, and the processor alters the form of the corresponding first, second or third radio information icons 714, 718 or 722 by displaying the corresponding radio information icon as filled-in. In FIG. 7*b*, the menu item corresponding to the first radio touch icon 712 has been selected, as indicated by the first radio information icon 714 having a filled-in appearance.

FIG. 7*d* shows a first check touch icon 730 with corresponding first check-information icon 732, a second check touch icon 734 with corresponding second check information icon 736 and a third check touch icon 738 with corresponding third check information icon 740. The processor 220 detects selection of menu items corresponding to the first, second ,or third check touch icons 730, 734, or 738 in a similar fashion as with the radio touch icons 712, 716 and 720. When the processor 220 detects a touch to any of the check touch icons 730, 734 or 738, the processor causes a "✓" symbol to be displayed in the corresponding check information icon box, indicating that the corresponding menu item has been selected. The first check touch icon 730 is shown as selected, indicated by the "✓" symbol present in the first check information icon 732. The second check touch icon 734 is shown as un-selected, indicated by absence of a "✓" symbol in the second check information icon 736. The third check touch icon 738 is shown as unselectable, indicated by the shaded-in appearance of the third check touch icon 738 and corresponding third check information icon 740.

Figure 7E:
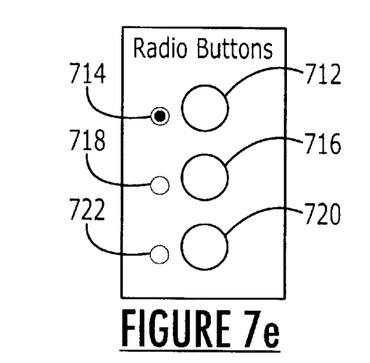
FIGS. 7e and 7f illustrate an alternate design for radio buttons and check boxes respectively in accordance with an embodiment of the invention.
Figure 7F:
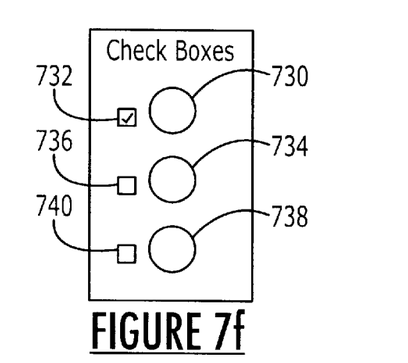

FIGS. 7*e* and 7*f* illustrate an alternate design for radio button and check boxes respectively which may be displayed on a display, in accordance with an embodiment of the invention. The radio information icons and the check information icons are placed on the opposite side of the radio touch icons and check touch icons respectively. Although not shown, the radio information icons 714, 718 and 722 need not be circular, but may be any shape, and the check information icons 732, 736 and 740 need not be square, but may be any shape. Further, when a radio or checkbox is selected by depressing the corresponding radio touch icon 712, 716 or 720, or check touch icon 730, 732 or 738, any means for marking the boxes to indicate a selection may be used.

Thus, having the radio touch icons and check box touch icons in the form of a button emphasizes touchability of the radio and check touch icons to make a desired selection. Further, the radio and check box information icons being separate from the radio and check box touch icons makes it possible to determine whether the selection was detected without the user needing to remove his/her finger from the corresponding radio or check box touch icon.

Figure 8:
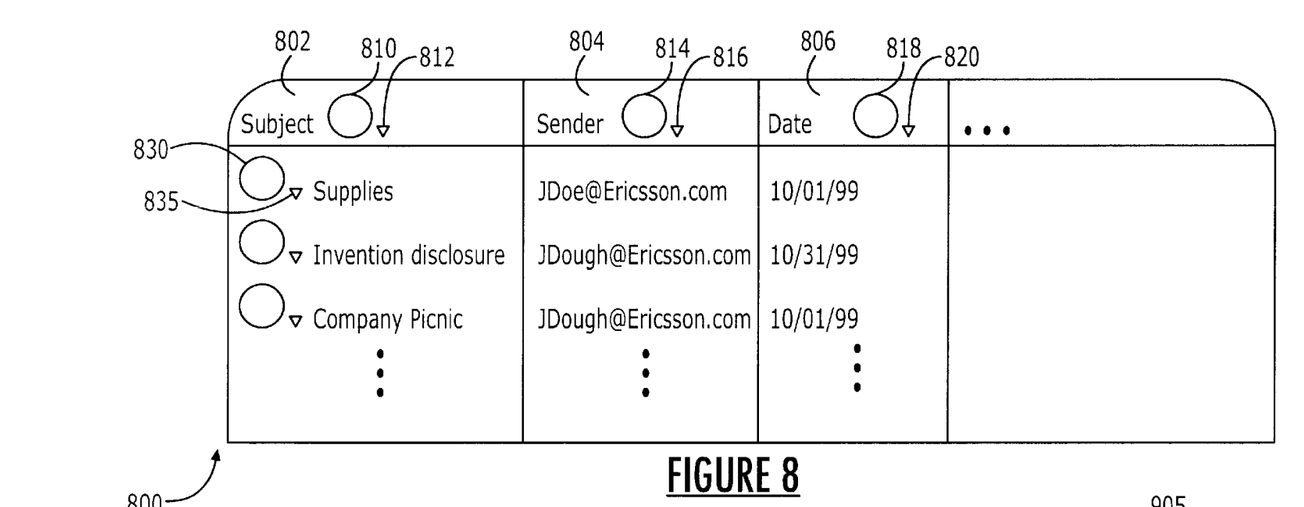
FIG. 8 illustrates an e-mail table structure in accordance with an embodiment of the invention.

FIG. 8 illustrates an e-mail table structure 800, which may be displayed on a display in accordance with an embodiment of the invention. Information regarding an e-mail message is displayed in fields including a subject field 802, a sender field 804 and a date field 806. A subject field touch icon 810 and a subject field information icon 812 allow the user to sort e-mail messages by a subject of the e-mail message. Similarly, a sender field touch icon 814 and sender field information icon 816, and a date field touch icon 818 and a date field information icon 820 allow the user to sort the e-mail message by the sender field and date field respectively. The processor 220 detects contact with the subject, sender and date touch icons 810, 814 and 818, and sorts the e-mail messages by the respective field. The processor 220 may alter the form of the field information icons 812, 816 and 820 to indicate by which field the e-mail messages are sorted. For example, in FIG. 8, the processor 220 has displayed an altered form of the date field information icon 820 as being "filled-in", indicating that the date field 806 is the field by which the e-mail messages are being sorted. In an alternate embodiment (not shown), the information icons 812, 816 and 820 may be displayed as a word, for example "sort". An altered form of the information icon according to this embodiment may, for example, be "sort" or "sort".

In another embodiment, e-mail touch and information icons, for example an e-mail touch icon 830 and an e-mail information icon 835 may be displayed on the display 210 corresponding to e-mail messages, such that when the processor 220 detects contact with the e-mail touch icon 830, the corresponding e-mail message is displayed on the display 210.

One skilled in the art would realize that the e-mail touch icon 830, and the field touch icons 810, 814 and 818 may be used independent of one another. Further, although shown as used in conjunction with an e-mail table structure, it would be apparent to one skilled in the art that touch and information icons would be useful in any tabular structure, including, for example, tables generated in data base programs.

Thus, the field touch icons 810, 814 and 818, and e-mail touch icon 830 being in the form of a button emphasizes touchability of the field and e-mail touch icons. Further, as the field information icons 812, 816 and 820 and the e-mail information icon 835 are removed from the corresponding touch icon, a user may contact the touch icon without blocking view of the symbol indicating which action will occur.

Figure 9:
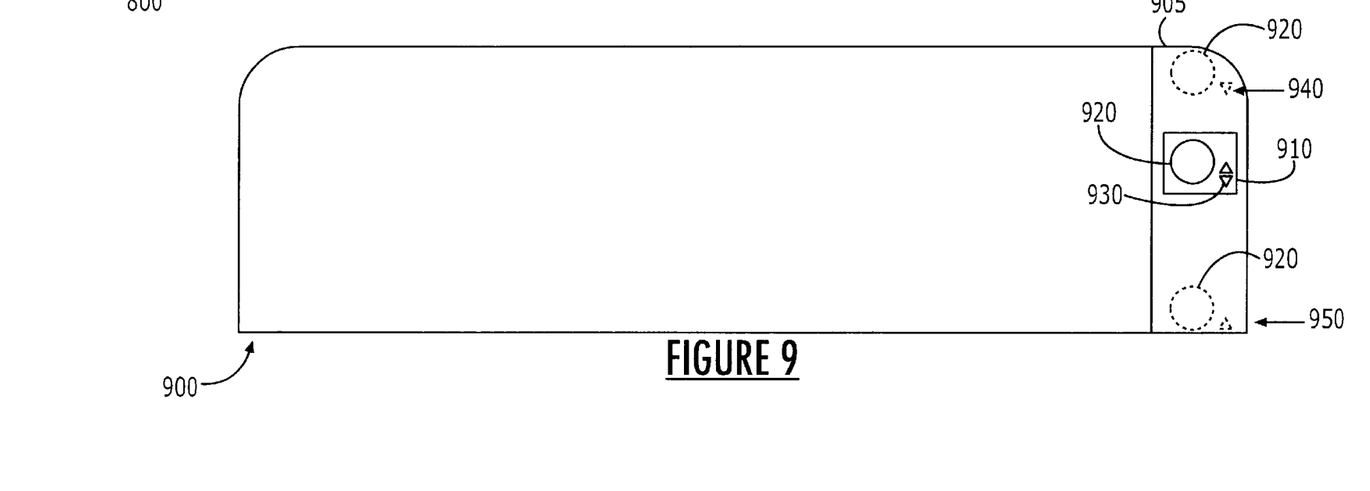
FIG. 9 illustrates a web page structure in accordance with an embodiment of the invention.

FIG. 9 illustrates a web page structure 900 which may be displayed on a display in accordance with an embodiment of the invention. A page view scroll bar 905 includes a page display indicator 910 indicating the percentage of the web page displayed on the display 210. A scroll touch icon 920 and a scroll information icon 930 may be displayed by the processor 220 superimposed over the page display indicator 910, and emphasizes the touchability of the page display indicator 910 for scrolling through a web page. As shown, the scroll information icon 930 may be in the form of an up arrow stacked above a down arrow indicating that the page display indicator 910 may be scrolled up or down to display additional portions of the web page. In further embodiments, the scroll information icon 930 may be displayed by the processor 220 as a down arrow, indicated at 940, when the user has, for example, scrolled to the top of a web page, and may be displayed as an up arrow, as indicated at 950, when, for example, the user has scrolled to the bottom of the web page.

Although the scroll touch icon 920 is shown superimposed over the display indicator 910, the advantages obtained from having the scroll touch icon may be attained where the scroll touch icon 920 is displayed directly above, or below the display indicator 910. In an alternate embodiment not shown, the scroll touch icon may replace the display indicator 910.

Further, although the scroll touch and information icons have been disclosed with respect to a web page, one skilled in the art would realize that the advantages gained therefrom would be attained in any application using a scroll bar, for example, word processing programs.

Having the scroll touch icon 920 and scroll information icon 930 emphasizes the touchability of the display indicator 910 without blocking the user's view of the action represented by the information icon.

Figure 10:
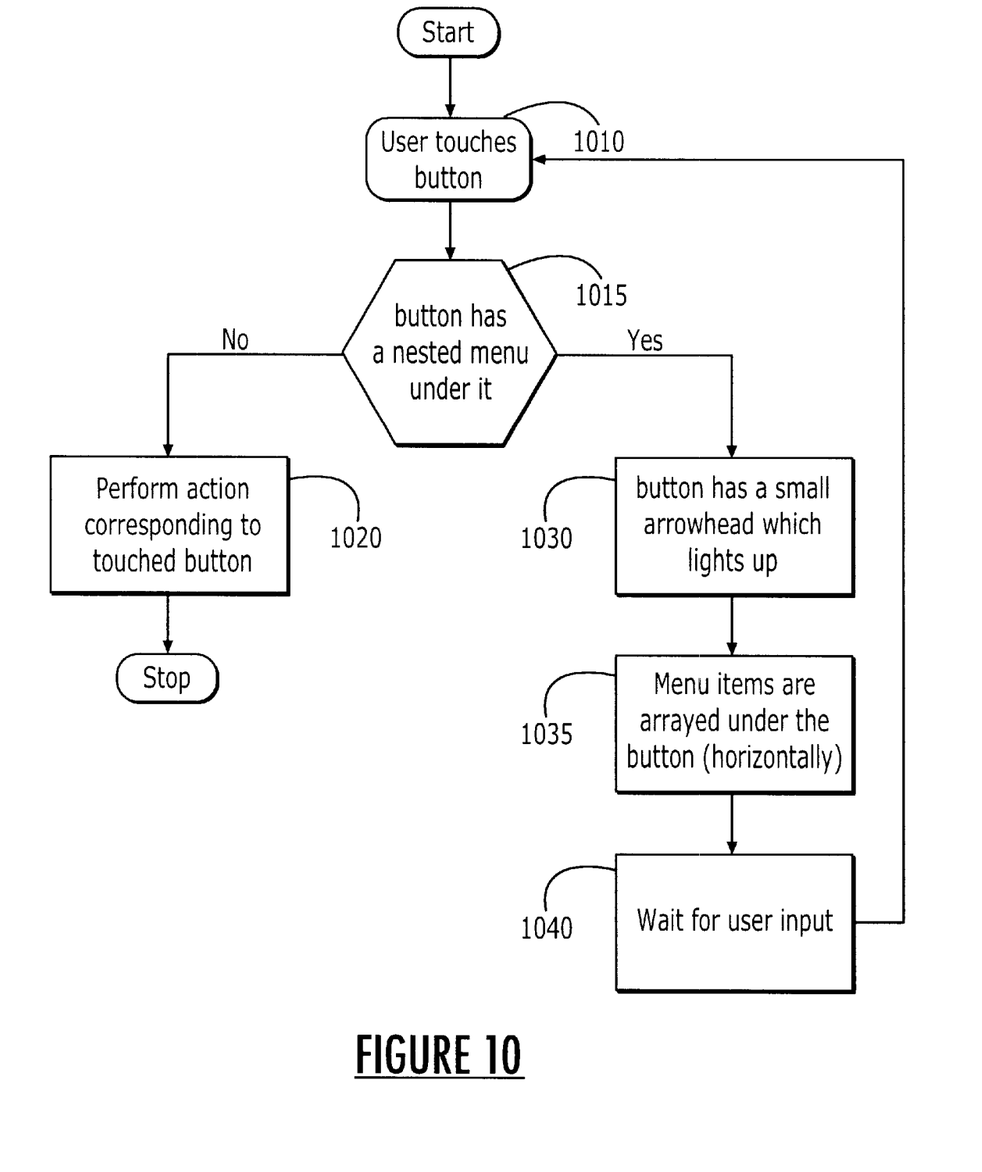
FIG. 10 is a flowchart illustrating operation of the device in accordance with an embodiment of the invention.

FIG. 10 is a flowchart illustrating operation of the information processing device in accordance with the invention.

The flowchart begins in step 1010 where the user touches a touch icon, for example the touch icon 250 (FIG. 2). The processor 220 detects the touch, and in step 1015 it is determined by the processor whether the menu item corresponding to the touch icon has a sub-menu. This determination is made by the processor 220 using data available to the processor regarding the menu structure for the current program, as is known by one skilled in the art. A nested, or sub-menu is indicated to the user by the presence of an information icon, for example the information icon 260. The lack of a sub-menu may be indicated to the user by the absence of the information icon. If it is determined in step 1015 that no sub-menu exists, the method proceeds to step 1020 where the processor 220 causes the menu item corresponding to the touch icon to be selected or carried out. However, where it is determined that the menu item is associated with a corresponding sub-menu in step 1015, the processor 220 causes the information icon to change form, for example, by displaying the information icon as having a "lighted-up" appearance, as shown in step 1030. The processor 220 causes the sub-menu items to be displayed on the display 210 below the touch icon as shown in step 1035, and waits for the user input as shown in step 1040. When user selection of a sub-menu item is detected by the processor 220, the method returns to step 1010, and proceeds as previously discussed.

In a further embodiment, sub-menus close if not used soon enough, for example, where a processor 220 timer (not shown) times-out.

In another embodiment the sub-menu closes if another touch icon not within the sub-menu is selected by a user.

In a further embodiment of the invention, the form of the information icon is changed when the corresponding touch icon is selected by the user. For example, where the processor 220 displays the information icon as a "▼" symbol, the processor may alter the form of the information icon by displaying the "▼" symbol with a "lighted-up" appearance when the corresponding touch icon is selected by the user. When the sub-menu is closed, the information icon may return to its previous form. In a further example, where the processor 220 displays the information icon as a "+" symbol, the processor may alter the form of the information icon by displaying the information icon as a "−" symbol when the corresponding touch icon is selected by the user.

One skilled in the art would realize that the touch icons, although shown in the form of a round button, may be square or any other shape. Further, relative placement of the touch icon with the information icon is important only to the extent that the information icon is at least substantially visible when the user is touching the touch icon. Thus, the touch icon may be displayed in contact with the information icon (FIG. 2b), or may even be displayed on an opposite end of a corresponding menu item from the information icon.

Although the touch and information icons have been disclosed as being used with a handheld device, the touch icon and information icon and advantages therefrom would be useful in any device having a touch-responsive display and utilizing menu-driven programs.

Still other aspects,. objects, and advantages of the present invention can be obtained from a study of the specification, the drawings, and the appended claims. It should be understood, however, that the present invention could be used in alternate forms where less than all of the objects and advantages of the present invention and preferred embodiments as. described above would be obtained.

We claim:

1. An information processing device including:
   a display adapted to selectively display:
   a menu including at least one menu item;
   an information icon displayed adjacent the at least one menu item, said information icon showing an action which may be performed on the menu item; and
   a touch icon displayed adjacent the at least one menu item and within a touch-responsive area of the display, the touch icon not overlapping the information icon; and
   a processor coupled to the display adapted to detect contact with the touch-responsive area of the display and, responsive to the detecting, to perform the-action shown by the information icon on the corresponding menu item, the processor being further adapted to cause a sub-menu to be displayed in response to contact detected with the touch-responsive area, the sub-menu comprising a plurality of child menu items arranged horizontally on the display below the touch icon.

2. The device of claim 1 wherein the information icon is displayed as an arrow icon.

3. The device of claim 1 wherein the processor changes a form of the information icon displayed on the display in response to contact detected with the area defining the touch icon.

4. The device of claim 3 wherein the information icon form is selectively one of a plus sign and a minus sign, and the processor selects the form of the information icon as the other of the plus sign and the minus sign in response to contact detected with the touch-responsive area.

5. The device of claim 1 wherein the information icon is one of a plus sign and a minus sign.

6. The device of claim 1 wherein the menu is in the form of a tree structure, and the at least one menu item is at least one tree structure element.

7. The device of claim 1 wherein the display further comprises a scroll bar and a scroll display indicator.

8. An information processing device including:
   a display adapted to selectively display
   a menu comprising a combination box structure and including at least one menu item comprising a combination box structure element,
   an information icon displayed adjacent the at least one menu item, said information icon showing an action which may be performed on the menu item, and
   a touch icon displayed adjacent the at least one menu item and within a touch-responsive area of the display, the touch icon not overlapping the information icon; and
   a processor coupled to the display adapted to detect contact with the touch-responsive area of the display and, responsive to the detecting, to perform the action shown by the information icon on the corresponding menu item.

9. The device of claim 8 wherein the information icon is displayed as an arrow icon.

10. The device of claim 8 wherein the processor changes a form of the information icon displayed on the display in response to contact detected with the area defining the touch icon.

11. The device of claim 10 wherein the information icon form is selectively one of a plus sign and a minus sign, and the processor selects the form of the information icon as the other of the plus sign and the minus sign in response to contact detected with the touch-responsive area.

12. The device of claim 8 wherein the information icon is one of a plus sign and a minus sign.

13. The device of claim 8 wherein the display further comprises a scroll bar and a scroll display indicator.

14. An information processing device including:
   a display adapted to selectively display:
   a menu comprising a table structure and including at least one menu item comprising a table element;
   information icon displayed adjacent the at least one menu item, said information icon showing an action which may be performed on the menu item; and a touch icon displayed adjacent the at least one menu item and within a touch-responsive area of the display, the touch icon not overlapping the icon; and
   a processor coupled to the display adapted to detect contact with the touch-responsive area of the display and, responsive to the detecting, to perform the action shown by the information icon on the corresponding menu item.

15. The device of claim 14 wherein the information icon is displayed as an arrow icon.

16. The device of claim 14 wherein the processor changes a form of the information icon displayed on the display in response to contact detected with the area defining the touch icon.

17. The device of claim 16 wherein the information icon form is selectively one of a plus sign and a minus sign, and the processor selects the form of the information icon as the other of the plus sign and the minus sign in response to contact detected with the touch-responsive area.

18. The device of claim 14 wherein the information icon is one of a plus sign and a minus sign.

19. The device of claim 14 wherein the display further comprises a scroll bar and a scroll display indicator.

20. A method for processing information for a touch-based menu-driven device comprising:
   displaying (1) a menu having at least one menu item, (2) an information icon corresponding to the at least one menu item adjacent the menu item, said information icon showing an action which may be performed on the menu item, and (3) a touch icon corresponding to the at least one menu item and displayed in a touch-responsive area of the display not overlapping the information icon;
   detecting contact with the touch-responsive area; and
   responsive to detecting contact, performing the action shown by the information icon, including displaying a plurality of child menu items arranged horizontally on the display below the touch icon.

21. The method of claim 20 further comprising the step of altering the form of the information icon responsive to the detecting.

22. The method of claim 20 further comprising providing a scrolling option to view the child menu items.

23. A method for processing information for a touch-based menu-driven device comprising:
   on a display, displaying (1) a menu comprising a combination box structure having at least one menu item comprising a combination box structure element, (2) an information icon corresponding to the at least one menu item adjacent the menu item, said information icon showing an action which may be performed on the menu item, and (3) a touch icon corresponding to the at least one menu item and displayed in a touch-responsive area of the display not overlapping the information icon;
   detecting contact with the touch-responsive area; and
   responsive to detecting contact, performing the action shown by the information icon.

24. The method of claim 23 further comprising the step of altering the form of the information icon responsive to the detecting.

25. The method of claim 23 further comprising providing a scrolling option to view the child menu items.

26. A method for processing information for a touch-based menu-driven device comprising:
   displaying (1) a menu comprising a combination box structure having at least one menu item comprising a combination box structure element, (2) an information icon corresponding to the at least one menu item adjacent the menu item, said information icon showing an action which may be performed on the menu item, and (3) a touch icon corresponding to the at least one menu item and displayed in a touch-responsive area of the display not overlapping the information icon;
   detecting contact with the touch-responsive area; and
   responsive to detecting contact, performing the action shown by the information icon.

27. The method of claim 26 further comprising the step of altering the form of the information icon responsive to the detecting.

28. The method of claim 26 further comprising providing a scrolling option to view the child menu items.

* * * * *

UNITED STATES PATENT AND TRADEMARK OFFICE
CERTIFICATE OF CORRECTION

PATENT NO. : 6,580,442 B1
DATED : June 17, 2003
INVENTOR(S) : Singh et al.

It is certified that error appears in the above-identified patent and that said Letters Patent is hereby corrected as shown below:

<u>Column 11,</u>
Line 7, should read -- an information icon displayed adjacent then at least one --

Signed and Sealed this

Fourth Day of November, 2003

JAMES E. ROGAN
*Director of the United States Patent and Trademark Office*